United States Patent Office 3,144,600
Patented Aug. 11, 1964

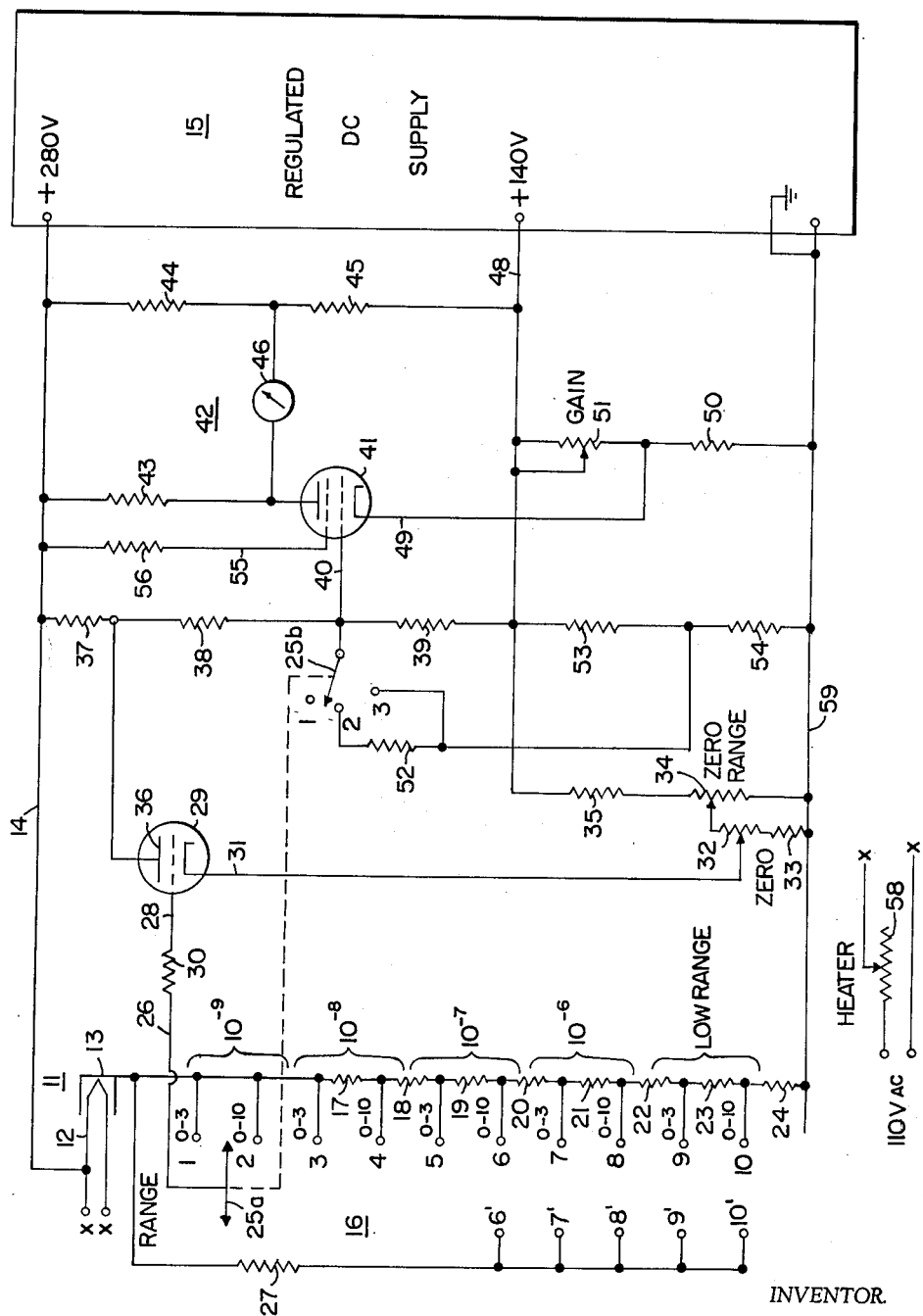

3,144,600
GAS LEAK DETECTOR
John A. Roberts, Lynnfield Center, Mass., assignor to General Electric Company, a corporation of New York
Filed Nov. 14, 1962, Ser. No. 237,502
15 Claims. (Cl. 324—33)

This invention relates to improvements in electrical leak detectors for detecting the presence of certain substances or impurities in gases, such as are disclosed in U.S. Patent 2,550,498, issued April 24, 1951, to Chester W. Rice and assigned to the same assignee as the present invention.

In the Rice patent, there is disclosed apparatus for detecting substances such as certain gases and vapors in an atmosphere by directing a sample of that atmosphere into an electrical discharge device, which permits the suspected substance to induce positive ion formation at a positively charged and heated electrode. The positive ions so formed are then collected by a negatively charged electrode to produce an indicating current that is proportional to the concentration of the substance being detected.

One common use of these types of detectors is to detect the presence of the halogens and their compounds. In order to detect widely varying concentrations of such compounds, the prior art halogen leak detectors have provisions for adjusting the sensitivity of the detector in order to extend the useful range of the leak detector. Such detectors have ranges of sensitivity which limit their use to the detection of leak rates within a span of leak rates of the order of two decades. In addition, the lower limits of sensitivity of such detectors prevent the accurate measurement of leak rates less than leak rates of the order of .01 ounce per year which equals 1.8 times $10^{-6}$ cc./sec.

Such a limit of sensitivity of halogen-sensitive element types of leak detectors is no longer acceptable in some types of applications wherein it is necessary to measure leaks having much smaller leak rates. For example, such types of prior art leak detectors cannot serve the refrigeration industry where it was desired to be able to measure the leak rate of halogen-filled bellows controls in the $10^{-9}$ cc./sec. region. In addition, applications have arisen in the automation industry to detect leaks from an entire system enclosed in a large enclosure for checking the entire system at one time. By their very nature, the concentrations in such a large enclosure are very small, requiring extremely sensitive and stable detectors.

Such prior art halogen-sensitive leak detectors are also of marginal stability when operating near the upper limits of its sensitivity. This marginal stability is evidenced by fluctuations in the output indication of the leak detector which interferes with the measurement being taken on the system in question. This lack of stability of the leak detector presented problems in the calibration of the leak detector for quantitative measurements since it is difficult to obtain a stable output meter indication which is necessary for such calibrations.

The prior art calibration technique for quantative measurements of leak detectors consists of introducing a standard leak of known rate into proximity with the probe and then varying the sensitivity of the detector until the output meter indication equals the known leak rate. In addition to the stability problems of the detector, the adjustment of the sensitivity of the detector, which is accomplished in the prior art devices by adjusting the heater voltage of the halogen-sensitive element, is not altogether successful. This is primarily due to the coarse nature of the sensitivity control attainable by varying heater voltage as well as the thermal lag of the element itself which is normally of the order of fifteen minutes or more.

It is therefore an object of my invention to provide an improved leak detector which is capable of measuring leaks which are smaller than those which were heretofore capable of measurement by halogen-sensitive types of leak detectors.

It is another object of my invention to provide a sensitive element type of leak detector which is capable of accurately measuring leak rates over a range which is greater than heretofore attainable.

It is a further object of my invention to provide an improved multi-range leak detector having improved operating characteristics which facilitate its calibration in order to obtain accurate quantitative measurements of leak rates falling in any of its ranges of sensitivity.

In accordance with another feature of this invention, a wide range of sensitivity is obtained by providing means for selectively controlling the gain of the signal amplifier as well as the amount of attenuation of the input signal.

Provisions are also made for calibrating the leak detector with a standard leak by controlling the gain of the signal amplifier in cooperation with the control of the sensitivity of the halogen-sensitive element.

In accordance with another feature of this invention, the variation of the gain of the signal amplifier for selecting predetermined ranges of operation, as well as for calibrating the detector in all of its ranges of operation, is effected in such a manner as to prevent its interference with the zero adjustment of the output meter. Zero adjustment of the instrument is necessary to provide a means for nulling the voltage produced by the positive ion current which flows in the sensitive element even in the presence of clean air in the element. This is accomplished by introducing in the amplifier input circuit an adjustable zeroing voltage of opposite polarity to that of the signal emanating from the halogen-sensitive element. Since the magnitude of the input signal applied to the input of the signal amplifier in the presence of clean air will vary depending upon the amount of attenuation introduced for range-selecting purposes, the magnitude of the zeroing voltage must be able to vary over a range sufficient to null the instrument on its highest range of sensitivity; i.e., the condition wherein the least amount of attenuation is introduced in the signal from the sensitive element.

Other objects and features of my invention will be apparent from the following description taken in connection with the accompanying drawing which is a schematic diagram of the preferred embodiment of my invention.

Referring now to the drawing, there is shown a diode element 11 which is sensitive to a presence of gaseous substance, such as halogens and their compounds. Sensing element 11 consists of a heated emitter 12 and a collector 13 arranged in a coaxial fashion. Conductor 14 which is connected to the plus 280 volts terminal of regulated D.-C. supply 15 provides means for applying the positive potential to emitter 12 which is connected across a ten volt A.-C. heater supply through heater control potentiometer 58 which provides means for adjusting the sensitivity of halogen sensitive element 11.

Collector electrode 13 is in turn connected to the grounded terminal of D.-C. supply 15 through attenuator 16 and conductor 59. Attenuator 16 is in turn composed of a plurality of series connected resistors 17–24. Manually controllable sensitivity control switch 25 has an attenuation control section 25a and a gain control section 25b which cooperate to control the sensitivity of the detector. Attenuation control switch 25a provides means for selectively connecting conductor 26 to contacts 1–10 which are connected to various points on attenuator 16. Attention is drawn to the fact that taps 1, 2 and 3 are directly connected to collector electrode 13 to provide zero levels of attenuation of the signals generated at collector 13.

When a potential of the order of 250 volts is applied across sensing element 11 a positive ion background current will flow from the emitter to the collector when the element is exposed to pure air. However, when a trace of halogen gas is present between collector 13 and emitter 12, the ion current increases rapidly to provide a D.-C. signal which is linearly proportional to the concentration of halogen in the air. This relationship will hold as long as the potential across sensing element 11 stays within a relatively wide range of potentials since the element is insensitive to potential changes within that range. However, if the potential falls below this range the relationship will no longer hold. In this regard, it is noted that on the lower sensitivity ranges where much higher concentrations of halogen gas can be detected, the drop across attenuator 16 would rise to a point at which the potential across sensing element 11 would no longer be within the acceptable range, were it not for the presence of resistor 27. Resistor 27, which is directly connected in shunt with the upper portion of attenuator 16 when switch 25a is in contact with contacts 6'-10', thus provides means for maintaining a proper potential across sensing element 11 on the lower ranges of sensitivity.

The output of attenuator 16 which appears between conductors 26 and 59 is coupled to the input electrode 28 of triode 29 by resistance 30. The input circuit of the signal amplifying portion of the leak detector is completed from cathode 31 through zero potentiometer 32 and resistor 33. The upper end of potentiometer 32 is in turn connected to the slider of potentiometer 34 which is connected in series with resistor 35 across the 0 to 140 volt terminals of supply 15. The potential appearing between the slider of potentiometer 34 and conductor 59 is opposite in polarity to the potential appearing upon conductor 26 and thus provides means for balancing bridge circuit 42 when the sensitive element 11 is exposed to pure air to thus zero the instrument.

Zero range potentiometer 34 is provided in accordance with my invention due to the availability of such an extremely wide range of sensitivities. This control facilitates the accurate zeroing of the instrument on any of its scales since it provides means for controlling the magnitude of the range of zeroing potentials available at the slider of potentiometer 32. Since potentials must be available to zero the instrument on the highest ranges of sensitivity, relatively large potentials must be applied across potentiometer 32. However, with such potentials across potentiometer 32 it would be extremely difficult to zero the instrument on the lower ranges of sensitivity. Thus, zero range potentiometer 34 is provided to adjust the range of zeroing potentials across potentiometer 32.

The anode 36 of triode 29 is returned to +280 volts through resistor 37 and conductor 14. Resistors 38 and 39 which are series connected between the anode 36 and conductor 48 provide means for biasing the control electrode 40 of tube 41, as well as providing a means for coupling the D.-C. output signal of the first stage to the input circuit of the second stage of amplification.

Tube 41 is connected in one leg of bridge circuit 42, the other legs of which contain resistors 43, 44 and 45. Output indicating meter 46 provides means for indicating the state of balance of bridge circuit 42 which is controlled by the signals applied to control electrode 40. Bridge circuit 42 is energized by its connection between conductors 14 and 48 which are respectively connected between the +280 volts and +140 volts terminals of D.-C. supply 15.

In order to facilitate a clear understanding of the manner of operation of bridge circuit 42 specific component values will be assigned. In the preferred embodiment of my invention resistors 43 and 44 have a value of 22K while resistor 45 has a value of 13K. Since resistors 44 and 45 are connected in series across 140 volts, four milliamps will flow in this side of the bridge circuit. Thus, the bridge will be in a balanced condition when four milliamps flow through resistor 43. However, due to the screen current flowing from screen grid 55 through resistor 56, tube 41 will have to provide four milliamps plus the screen grid current. In the preferred embodiment of my invention, resistor 56 is 22K and results in a screen grid current of .66 milliamp.

It is desired that cathode 49 be at 140 volts potential when the bridge is in its balanced condition for reasons which will hereinafter be explained. Thus, cathode 49 is connected through resistor 50 to the grounded side of D.-C. supply 15. Resistor 50 thus has a value of 30K which provides the required 140 volt potential on the cathode 49. Thus, when the drop across resistor 39 equals the bias potential necessary for the plate to cathode resistance of tube 41 to be 13K, the bridge will be in a balanced condition. In the preferred embodiment of my invention, tubes 29 and 41 comprise separate halves of a 6CM8 tube. When utilizing such a tube with the values of resistance and potentials discussed, this bias potential will be in the order of −3 volts. Thus, the bridge will be in its balanced condition when the control electrode 40 is at +137 volts.

The instrument may thus be zeroed when sensing element 11 is exposed to pure air by adjusting zero potentiometer 32 until control electrode 40 is at +137 volts potential. Thereafter, any D.-C. signal emanating from sensing element 11 upon detecting the halogen compound will introduce a negative going D.-C. signal which drives grid 40 below its 137 volt bias potential. This will unbalance the bridge to provide an output indication on meter 46. The bias potential between control electrode 28 and cathode 31, which results in the bridge being balanced will be considered as its operating bias and therefore the condition of zero signal input to the amplifier.

Gain control potentiometer 51, which is connected in series between cathode 49 and conductor 48, provides means for controlling the de-generation in the output circuit of the amplifier in order to obtain the desired degree of stability. Since both ends of potentiometer 51 are tied to +140 volts when no signal is applied to the input of the amplifier, the position of the slider on potentiometer 51 will have no effect upon the zero balance condition of bridge circuit 42.

Sensitivity control switch 25b controls the gain of the amplifier upon its selective connection to terminals 1', 2', and 3' by introducing respectively decreasing values of resistance in shunt with resistor 39. When switch 25b makes with contact 1' the amplifier is operating at maximum gain since the resistance between grid 40 and conductor 48 is maximum. When it is operated to contact 2', resistor 52 is connected in series with resistor 53. Since the total resistance of resistors 52 and 53 is small compared with respect to the value of resistor 39, the gain of the amplifier decreases. When switch 25b is in contact with 3', only resistor 53 is connected in shunt with resistor 39, thus causing the amplifier to assume its low gain condition.

It will be noticed that resistor 53 is connected in series with resistor 54 across the 140 volt potential existing between conductors 48 and 59. Resistor 54 is selected to have a value such that the potential at the point common to resistors 53 and 54 will assume a potential of +137 volts with respect to conductor 59. It will be seen that this is the same potential as is existing on the control electrode 40 when no signal is applied to the input of the amplifier. Thus, it can be seen that the position of switch 25b has no effect upon the zero balance of bridge 42.

In accordance with my invention, it can be seen that I have provided a leak detector that is capable of measuring leaks which are smaller than those which were heretofore capable of measurement by halogen sensitive element types of leak detectors. Furthermore, the leak detector covers a much wider range of leak rates than was heretofore possible without generating operational problems which render the leak detector difficult for the operator to utilize.

While the following component values are not to be considered as limiting my invention, these values have proved to be satisfactory for obtaining a leak detector with the desired operational features and having the following leak-rate ranges:

| Position of Switch 25 | Range of Leak Rates, cc./sec. |
|---|---|
| 1 | $0$–$3 \times 10^{-9}$ |
| 2 | $0$–$10 \times 10^{-9}$ |
| 3 | $0$–$3 \times 10^{-8}$ |
| 4 | $0$–$10 \times 10^{-8}$ |
| 5 | $0$–$3 \times 10^{-7}$ |
| 6 | $0$–$10 \times 10^{-7}$ |
| 7 | $0$–$3 \times 10^{-6}$ |
| 8 | $0$–$10 \times 10^{-6}$ |
| 9 | Approx. $0$–$3 \times 10^{-5}$ |
| 10 | Approx. $0$–$10 \times 10^{-5}$ |

*Component Values*

| | |
|---|---|
| 17—1M | 33—330 ohms |
| 18—360K | 34—5K |
| 19—100K | 35—25K |
| 20—36K | 37—332K |
| 21—10K | 38—200K |
| 22—3.6K | 39—1M |
| 23—1K | 51—5K |
| 24—510 ohms | 52—100K |
| 27—47K | 53—39K |
| 30—100K | 54—2.4M |
| 32—5K | |

While I have shown and described a particular embodiment of my invention, it will be obvious to those skilled in the art that various changes and modifications can be made without departing from the invention, and I, therefore, aim in the appended claims to cover all such changes and modifications as fall within the spirit and scope of the invention.

What I claim as new and desire to secure by Letters Patent of the United States is:

1. A leak detector comprising an element responsive to the presence of gaseous substances for producing D.-C. signals representative of the concentration of said gaseous substances,
    means coupled to said element capable of assuming a plurality of different operative conditions for introducing different levels of attenuations in signals applied thereto in addition to a zero level of attenuation,
    D.-C. signal amplifying means comprising input and output circuits and means capable of assuming a plurality of different operative conditions for controlling the gain of said amplifying means,
    means for coupling the output signals of said attenuation means across the input circuit of said signal amplifying means,
    a bridge circuit having said output circuit connected as one leg thereof, said output circuit comprising resistive means responsive to signals applied thereto for presenting values of resistance proportional to the magnitude of the applied signals,
    utilization means connected across one diagonal of said bridge circuit,
    a first source of potential connected across the other diagonal of said bridge circuit,
    and means operative for selectively controlling leak detector sensitivity by selectively controlling the operative condition of both said attenuating means and said gain controlling means to thereby provide a leak detector having a plurality of different selectable values of sensitivity.

2. The combination of claim 1 in which said resistive means comprises a uni-directional conductive device having a control electrode, a common electrode, and an output electrode, said common and output electrodes being in said one leg,
    said first source of potential having first and second terminals,
    said common electrode being connected to the point on said bridge circuit which is connected in common to said first terminal, said second terminal being connected to the diagonally opposite point on said bridge,
    and means D.-C. coupled to the output of the previous stage of said amplifying means for biasing said control electrode and coupling signals thereto, said biasing means causing said control electrode to assume a fixed potential when no input signals are applied to the input of said amplifying means, the difference in potential between said fixed potential and said potential of said first terminal providing a given biasing potential such that said common-to-output electrode resistance will assume a value necessary to balance said bridge circuit.

3. The combination of claim 1 in which said input circuit of said amplifying means comprises means for cancelling out the output signal of said attenuation means when said element is exposed to pure air.

4. The combination of claim 2 in which said gain controlling means comprises variable resistance means and a second source of potential connected in series between said control electrode and said first terminal of said first source of potential for varying the D.-C. resistance between said points, the resistive value of said variable resistance means being under the selective control of said sensitivity controlling means,
    said second source of potential being of polarity and magnitude such that both ends of said variable resistance means are at the same potential whereby the selective change in value of said variable resistance means has substantially no effect upon the balanced condition of said bridge circuit under conditions of zero signal input to said amplifying means.

5. The combination of claim 2 in which said connection between said common electrode and said first terminal of said first source comprises a variable resistor for providing controllable amounts of signal degeneration to thereby control the stability of said amplifying means.

6. The combination of claim 5 further comprising a third source of potential having first and second terminals, said third source being connected in series aiding relationship with said first potential source, the second terminal of said third source of potential being connected to said first terminal of said first source,
    and means connected between said common electrode and said first terminal of said third source of potential for causing said common electrode to assume a potential equal to the potential of said first terminal of said first source of potential when said control electrode has said fixed potential applied thereto to thereby place zero potential across said variable resistor so that selection of different amounts of degeneration will have substantially no effect upon the balanced condition of said bridge circuit under conditions of zero signal input to said amplifying means.

7. The combination of claim 2 in which said input circuit of said amplifying means comprises means for cancelling out the output signal of said attenuation means when said element is exposed to pure air so that said control electrode will assume said given biasing potential to thereby balance said bridge circuit.

8. The combination of claim 7 in which said cancelling means comprises a fourth source of potential,
    and a first resistive bleeder network connected across said fourth source, said network having a movable tap thereon for selecting a zeroing potential and applying it in series opposition to the output signal of said attenuation, the potential of said fourth source being sufficiently large to allow the selection of a zeroing potential sufficient to cancel said output signal of said attenuating means when said element is exposed to pure air.

9. The combination of claim 8 in which said fourth source of potential comprises a second resistive bleeder network across said third source of D.-C. potential, said network having a movable tap thereon which is connected to one side of said first bleeder network, the other side of said first bleeder network being connected to said first terminal of said third source to thereby provide control of the range of zeroing potentials available at the movable tap on said first bleeder network.

10. The combination of claim 4 further comprising a third bleeder network connected across said third source of D.-C. potential, said bleeder network comprising first and second resistors connected in series in the order named between said second and said first terminals of said third source of D.-C. potential, said first resistor of said third bleeder network forming said second source of potential.

11. The combination of claim 4 further comprising a third source of potential having first and second terminals, said third source being connected in series aiding relationship with said first potential source, the second terminal of said third source being connected to said first terminal of said first source, said element having an emitter electrode and a collector electrode, means for connecting said emitter electrode to said second terminal of said first source of potential, said second terminal being postiive with respect to its first terminal, said attenuation means comprising a plurality of resistors series connected between said collector electrode and said first terminal of said third source.

12. The combination of claim 11 in which said attenuation means further comprises means for selectively connecting one side of said amplifying means input circuit to various points upon said plurality of series connected resistors under control of said sensitivity controlling means, at least one of said points being directly connected to said emitter electrode so that zero attenuation is provided when said sensitivity controlling means is in its highest sensitivity operative condition, the operation of said sensitivity controlling means to its highest sensitivity operative condition causing said variable resistance means of said gain controlling means to assume its highest value of resistance to thereby result in said amplifying means assuming its maximum gain condition.

13. The combination of claim 12 in which said next lower point upon said plurality of series connected resistors is also directly connected to said collector electrode, said next lower point being selected upon operation of said sensitivity controlling means to the next lower sensitivity operative condition, said operation to said next lower sensitivity operative condition causing said second variable resistance means of said gain controlling means to assume a lower value of resistance to thereby result in said amplifying means assuming a lower gain condition.

14. The combination of claim 13 in which said variable resistance means of said gain controlling means remains in its lowest resistance condition when said selective connection means of said attenuation means is connected under control of said sensitivity controlling means, to points which result in attenuating the signals applied to said input circuit.

15. The combination of claim 14 in which said attenuation means further comprises means for lowering the resistance in series with said element when said sensitivity controlling means is in one of the low sensitivity operative conditions.

No references cited.